May 12, 1953  J. A. JONES  2,638,365
COUPLING
Filed Aug. 4, 1949

INVENTOR.
JOHN A. JONES
BY
*J. Wesley Everett*

Patented May 12, 1953

2,638,365

UNITED STATES PATENT OFFICE 2,638,365

COUPLING

John A. Jones, Baltimore, Md.

Application August 4, 1949, Serial No. 108,599

2 Claims. (Cl. 287—52.09)

The present invention relates to an improved shaft coupling or clamping mechanism for clamping pulleys, gear, and the like to a shaft.

The principal object of the invention is to provide a clamping means for collars, pulleys, or other driving or driven elements, which is adapted to engage a cylindrical surface without the necessity of scoring or penetrating the surface of the shaft as is the case when using a set screw or a key-way.

Another object of the invention is to provide such an article, or device, which may be easily and conveniently attached to, or detached from, the shaft.

Still another object of the invention is to provide a structure for such an article that will be economical to construct and efficient in its operation.

With these and other objects in view, the invention consists of the novel construction, combination and arrangement of parts as shown in the accompanying drawings and described in the written detailed description forming a part of this specification, in which.

Figure 1:
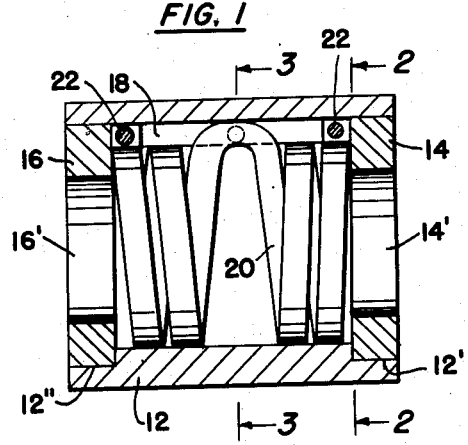
Figure 1 is a horizontal sectional view of the coupling.

In referring to the detail description of the article, the term coupling is used in its broad sense to indicate a means for holding an element in contact with a shaft such as a collar, the hub of a pulley, gears, and similar driving, or driven, elements. It is also intended to include any type of coupling between two shafts or machine parts where an element is to be secured to a cylindrical surface.

In pointing out the invention, like reference characters are used to indicate like and similar parts throughout the several views when practical to do so.

Referring more particularly to the construction of the coupling, there is provided a housing having a body member 12 with a cylindrical opening therein. This member 12 is formed with steps 12' and 12" at its opposite ends. Fitting within these steps are end bearing members 14 and 16. Cut horizontally within the portion 12 is a key-way 18, and fitted within the cylindrical opening of the portion 12 is a spiralled coil member 20 which is adapted to fit snugly within the cylindrical opening. The member 20 extends substantially the full length of the coupling between the end members 14 and 16. The spiral member 20 is coiled in opposite directions from its center, and the inside diameter of the coil is normally slightly larger than the bearing surfaces 14' and 16' in order that the coupling will slip easily over the shaft. These bearing surfaces are adapted to fit the shaft with a minimum of tolerance which will keep the coupling in alignment regardless of the position the gripping element 20 may take.

In effecting a gripping action on the shaft, there is preferably provided means at each end of the spiral to move the ends circumferentially within the housing, and in the same direction while the center of the spiral is moved in the opposite direction.

While both ends of the spiralled coil and the center portion are preferably moved to obtain the gripping action upon the shaft, it is not necessary, only in instances where an exceptional gripping action is needed, and the tightening action may only be applied either at the ends or at the center, the ends or center being fixedly held within the key-way 18.

In order to give the spiral the gripping action, there is provided a set-screw 22 at each end of the housing (only one being shown) which is carried within a threaded aperture within the housing, and a set-screw 24 similarly mounted within the housing for contacting the center portion 20' of the coil. As stated hereinbefore, the end set-screws move the coil in the same direction, and the centrally located set-screw moves the coil in the opposite direction.

Figure 2:
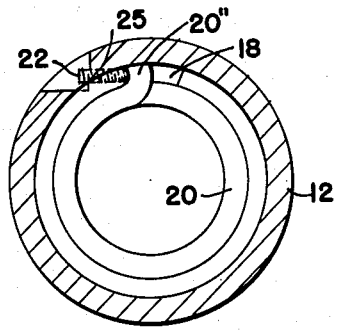
Figure 2 is a sectional view taken along the line 2—2 of Figure 1.
Figure 4:
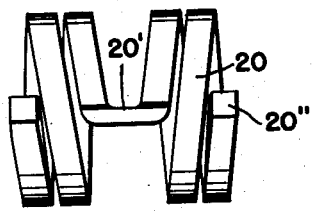
Figure 4 is a plan view of the clamping element.
Figure 3:
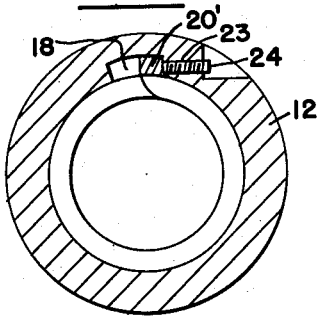
Figure 3 is a sectional view taken along the line 3—3 of Figure 1.

In manufacturing the coupling, the housing member 12 is preferably made of a tubing having the proper thickness and the proper cylindrical diameter. The tube is cut to proper length and the steps 12' and 12" are cut at each end thereof. Along the face of the cylinder is a slot 18 of a predetermined width. At each end of the housing there are end members 14 and 16 which are made separately and of such dimensions as to be pressed into the steps 12' and 12" of the member 12. The surfaces 14' and 16' of the end pieces are adapted to fit closely the shaft upon which the coupling is to be used. The coiled member 20 is formed to be carried within the cylindrical surface of the member 12 and the end members. The inner diameter of the coil is normally substantially that of the bearing surfaces 14 and 16. In this particular disclosure, the ends and a portion of the center section are turned outwardly to engage the slot 18. Opposite the location of the out-turned ends within the slot 18 is a threaded aperture 23 for receiving the screw 22. The set-screw 22 is located on the side of the slot 18 to exert pressure on the upturned end of the coil in the direction of the spiral, as shown in Figure 2, which will cause the inside diameter to be reduced upon moving the screw inwardly. The structure and aperture of a corresponding set-screw at the opposite end of the coil is substantially the same. Adjacent the center of the coil at 20' is a single screw 24 positioned on the opposite side of the slot 18 and is adapted to contact the loop portion of the coil at 20' for moving the center of the coil in the opposite direction. After the coupling has been assembled, the pressure screws are backed off to a predetermined point and the inner circumference of the coil ground to the size of the shaft after which the coil can be fastened to the shaft by tightening down on the screws. By using the double acting coil and the set-screws as described, an exceptional gripping action may be gotten on a shaft without defacing the shaft in the slightest degree.

While the coil member 20 is shown having two coils on each side of the center loop 20', it may be either a single coil or have any number in excess of two if the circumstances call for it, and while the coil has been described as having means at both ends and at the center for exerting pressure on the spiralled coil, it is not necessary in certain cases when extreme pressures are not required. In this case, either the end pressure means, or the center means, may be eliminated, and these respective points of the coil may be held within the slot 18 while either the end or center pressure means is operated.

Figure 6:
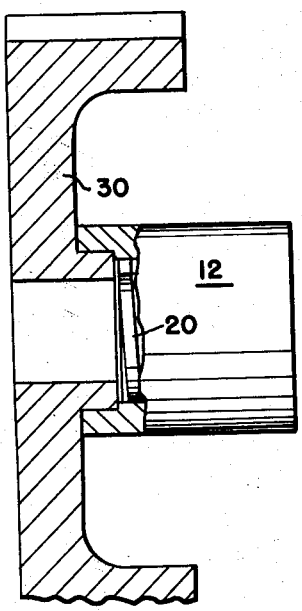
Figure 6 is a view partly in elevation and partly in section of a driving element associated with the coupling.
Figure 5:
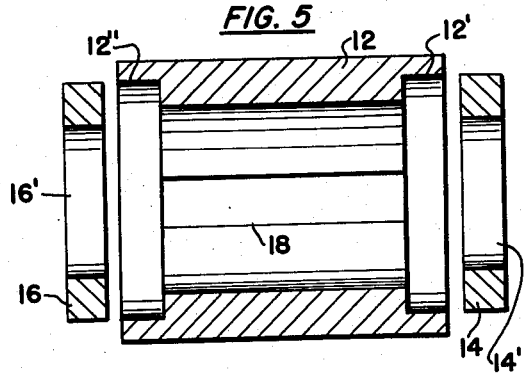
Figure 5 is a horizontal sectional exploded view of the coupling housing.

In operation, the coupling is adapted for use where the use of set-screws and key-ways in the shaft member is objectionable, and/or where it is necessary to make slight adjustment between the shaft and the coupling. For example, the coupling may be used to secure a timing gear 30 to a shaft, as illustrated in Figure 6, or any other element such as a pulley, collar, or the like.

While the invention has been shown and described in a particular form, it is not intended in any way to be a limitation as various changes may be made without departing from the spirit of the invention, and the scope of the invention is best defined in the appending claims.

I claim:

1. A shaft coupling of the class described comprising a continuous housing unit having an opening extending through the said housing, the outer end portions of which are of cylindrical form for slidably receiving a cylindrical shaft and a single internal recess formed in the housing between the cylindrical end portions, a single coiled helical gripping element carried within the recess and extending between the outer end portions having its normal inner diameter slightly larger than the cylindrical openings in the end portions, the said gripping element extending in opposite directions from a point adjacent its center, means for preventing the movement of the central portion of the gripping element against movement in the direction of the winding of the helix and means carried by the said housing adjacent the ends of the recess for operating the gripping element in the direction of the helix beyond its normal position for gripping the said shaft.

2. In a device as set forth in claim 1 having means for moving the central portion of the coiled helical gripping element in the opposite direction of the winding of the helix.

JOHN A. JONES.

References Cited in the file of this patent
UNITED STATES PATENTS

| Number | Name | Date |
|---|---|---|
| 631,956 | Diescher | Aug. 29, 1899 |
| 701,017 | Diescher | May 27, 1902 |